(12) United States Patent
Gassenmeier et al.

(10) Patent No.: US 7,105,194 B2
(45) Date of Patent: Sep. 12, 2006

(54) ORGANOLEPTIC COMPOSITIONS: USE OF 3-MERCAPTO ALKANOIC ACID ESTERS AS FLAVOR INGREDIENTS

(75) Inventors: Klaus Gassenmeier, Dübendorf (CH); Willi Grab, Singapore (SG); Christophe Galopin, West Chester, OH (US); Beatrice Bigler, Zürich (CH)

(73) Assignee: Givaudan SA, Vernier (CH)

( * ) Notice: Subject to any disclaimer, the term of this patent is extended or adjusted under 35 U.S.C. 154(b) by 115 days.

(21) Appl. No.: 09/800,624

(22) Filed: Mar. 7, 2001

(65) Prior Publication Data

US 2001/0031720 A1 Oct. 18, 2001

(30) Foreign Application Priority Data

Mar. 8, 2000 (EP) .................. 00104904

(51) Int. Cl.
*A23L 1/22* (2006.01)
(52) U.S. Cl. ............ 426/535; 426/534; 426/595; 426/650
(58) Field of Classification Search ........ 426/535, 426/534, 595, 650
See application file for complete search history.

(56) References Cited

U.S. PATENT DOCUMENTS

| 3,954,843 A | | 5/1976 | Helmlinger et al. | 260/481 |
| 4,426,403 A | | 1/1984 | Cyronak et al. | 426/535 |
| 4,631,194 A | * | 12/1986 | Courtney et al. | 426/535 |
| 5,047,256 A | * | 9/1991 | Bruijnje et al. | 426/535 |

FOREIGN PATENT DOCUMENTS

| CH | 557423 | 12/1974 |
| DE | 2363573 | 10/1974 |
| EP | 0399818 | 11/1990 |
| FR | 2 525 870 | 11/1983 |
| GB | 1409209 | 10/1975 |

OTHER PUBLICATIONS

Ashurst, P.R. ed., Food Flavorings, Second Edition, Blackie Academic & Professional, New York, 1995, pp. 155-157.*
Brietschuh et al, "Preparation of Steroisomers 3-Sulfinylbutyric Acid from (R)- und (S)-4-Methyl-2-oxetanone", Synthesis, Jan./Feb. 1992, 83-89 (abstract in English).
Shono, et al, "A New Synthesis of Optically Active β-Mercaptocarboxylic Acid Esters", Tetrahedron Letters, vol. 32, No. 46, pp. 6723-6726, 1991.

* cited by examiner

*Primary Examiner*—Leslie Wong
(74) *Attorney, Agent, or Firm*—Wood, Herron & Evans LLP

(57) ABSTRACT

The present invention relates to flavor or fragrance composition comprising at least one compound of the formula 1

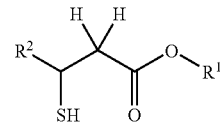

or a precursor thereof, wherein R1 represents a branched or unbranched alkyl, alkenyl or alkadienyl group containing 1 to 8 carbon atoms and R2 represents a methyl or an ethyl group and to a method of flavoring a food, a beverage or a consumer healthcare or household product using at least one of these compounds.

8 Claims, No Drawings

ORGANOLEPTIC COMPOSITIONS: USE OF 3-MERCAPTO ALKANOIC ACID ESTERS AS FLAVOR INGREDIENTS

This application claims the benefit of European Application Serial No. 104904.8, filed Mar. 8, 2000.

FIELD OF THE INVENTION

The present invention relates to flavor or fragrance compositions comprising 3-mercapto carboxylic esters and/or precursors thereof, and to a method of flavoring a food, a beverage or a consumer healthcare or household product using these compounds.

BACKGROUND OF THE INVENTION

Swiss patent 557 423 describes 3-mercapto carboxylic esters of the general formula I

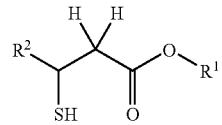

wherein R1 represents an alkyl or alkenyl or alkadienyl group with 1 to 6 carbon atoms, and R2 represents an alkyl or alkenyl group containing 3 to 9 carbon atoms. These 3-mercapto carboxylic esters are known as flavor or fragrance compounds, and possess either green organoleptic properties, e.g. leaf green (3-mercapto-4-methylhexanoic acid ethyl ester), green fruity (3-mercapto-4-methylhexanoic acid hex-3-enyl ester), green and pungent (3-mercapto-4-methylhexanoic acid 2-hexenyl ester), or fatty organoleptic properties (e.g. 3-mercaptooctanoic acid ethyl ester, 3-mercaptononanoic acid methyl ester, 3-mercaptodecanoic acid ethyl ester or 3-mercapto-4-ethylhexanoic acid ethyl ester). An exception is 3-mercapto-4-methylhexanoic acid hexa-2,4-dienyl ester with a sulfurous, onion and garlic-like note. The latter-mentioned compound demonstrates that a small change in the structure of the compound can cause a dramatic change of the odor properties; e.g. a hexa-2,4-dienyl group instead of a hex-3-enyl group changes the organoleptic character from green-fruity to onion, garlic-like.

The flavor and fragrance industry is further interested in new ingredients with a clear fruity character. Thus, the above mentioned compounds would be of interest if they do not have the disadvantage that the fruity note is always combined with green and/or fatty notes.

SUMMARY OF THE INVENTION

The invention is directed to a flavor or fragrance composition having at least one compound of formula I

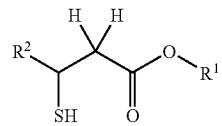

or a precursor thereof, wherein R1 represents a branched or unbranched alkyl, alkenyl or alkadienyl group containing 1 to 8 carbon atoms and R2 represents a methyl or ethyl group. In one embodiment, R1 may be methyl, ethyl, n-propyl, iso-propyl, n-butyl, iso-butyl, tert-butyl, n-hexyl, (Z)-2-hexenyl, (E)-3-hexenyl, (E)-2-hexenyl, (Z)-3-hexenyl or n-octyl. The compound in the composition may be 3-mercaptobutanoic acid methyl ester, 3-mercaptobutanoic acid ethyl ester, 3-mercaptobutanoic acid n-hexyl ester, (R)-3-mercaptobutanoic acid methyl ester, 3-mercaptobutanoic acid (Z)-3-hexenyl ester, 3-mercaptopentanoic acid ethyl ester. Precursors of these compounds may also be used, such as where the precursor is formed by reacting acyl chloride with the compound of formula 1. The concentration of the compound of formula 1 or the precursor in the composition is from 0.001% to 30%.

The invention is also directed to a method of adding a flavor or fragrance to a product by adding to the product at least one compound of formula 1

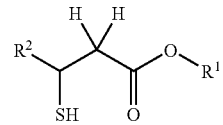

or a precursor, wherein R1 represents a branched or unbranched alkyl, alkenyl or alkadienyl group containing 1 to 8 carbon atoms and R2 represents a methyl or an ethyl group. The product may be a food, beverage, healthcare product, and/or a household product. In one embodiment, R1 is selected from the group consisting of methyl, ethyl, n-propyl, iso-propyl, n-butyl, iso-butyl, tert-butyl, n-hexyl, (Z)-2-hexenyl, (E)-3-hexenyl, (E)-2-hexenyl, (Z)-3-hexenyl and n-octyl. The compound may be 3-mercaptobutanoic acid methyl ester, 3-mercaptobutanoic acid ethyl ester, 3-mercaptobutanoic acid n-hexyl ester, (R)-3-mercaptobutanoic acid methyl ester, 3-mercaptobutanoic acid (Z)-3-hexenyl ester, 3-mercaptopentanoic acid ethyl ester, or precursors of these compounds. The compound(s) of formula I or the precursor(s) thereof is/are present in an amount of 0.001 mg/kg to 500 mg/kg of the product.

DETAILED DESCRIPTION

Surprisingly, it has now been found that compounds of formula I

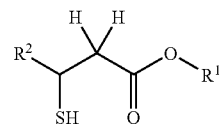

and precursors thereof, wherein R1 represents an alkyl, alkenyl or alkadienyl group containing 1 to 8 carbon atoms and R2 represents a methyl or an ethyl group, whereby the alkyl, alkenyl or alkadienyl group can be branched or unbranched, overcome the afore mentioned disadvantage of having the fruity note always combined with green and/or fatty notes, and, hence, can be used as flavor or fragrance compounds with a clear fresh character. Thus, the present invention is directed to this subject matter. The compounds according to the invention can advantageously be used as ingredients for flavor or fragrance compositions as will be explained below. If the compounds contain double bonds, they can exist in any desired stereoconfiguration.

Preferred examples of R1 are methyl, ethyl, n-propyl, iso-propyl, n-butyl, iso-butyl, tert-butyl, n-hexyl, (Z)-2-hexenyl, (E)-3-hexenyl, (E)-2-hexenyl, (Z)-3-hexenyl and n-octyl.

The compounds include the racemates as well as the pure enantiomers, which are defined by the asymmetric center in beta position to the acid functionality.

Especially preferred compounds to be used as flavor or fragrance ingredients are 3-mercaptobutanoic acid methyl ester, 3-mercaptobutanoic acid ethyl ester, 3-mercaptobutanoic acid n-hexyl ester, (R)-3-mercaptobutanoic acid methyl ester, 3-mercaptobutanoic acid (Z)-3-hexenyl ester and 3-mercaptopentanoic acid ethyl ester, whereby 3-mercaptobutanoic acid methyl ester and 3-mercaptobutanoic acid ethyl ester are most preferred.

Structurally, the compounds according to the invention differ from the compounds described in the afore mentioned Swiss patent 557 423 in their chain length of the acid.

3-mercaptoalkanoic acid esters according to the present invention are known in the literature, e.g. by the German Offenlegungsschrift 2 363 573. They are, for example, used as intermediates in the synthesis of pharmaceuticals (e.g. leukotriene antagonists and inhibitors of leukotriene biosynthesis as described by the European patent publication EP 0399818). Further, U.S. Pat. No. 3,954,843 describes the general synthetic pathways for the production of the racemates, and in Tetrahedron Letters, Vol 32, No. 46, pp 6723–6726, 1991, the production of the pure enantiomer is described.

It has been found that the compounds of the present invention exhibit fruity properties, mainly in the range of passion fruit, cassis or tropical fruit. These organoleptic properties have never been described before, although the compounds themselves are already known, as previously stated. They differ strongly in their organoleptic properties from the compounds mentioned in Swiss patent 557 423, and the unwanted, disturbing green or fatty odor aspects are absent.

The preferred compounds according to the invention are the short chain compounds with a total maximum number of 7 carbon atoms. They exhibit strong cassis-like and/or red fruit notes, which remind on passion fruit, black current and blackberry.

Compounds according to the invention with a total carbon atom number of equal to or greater than 8 are very substantive and, therefore, are specifically useful as ingredients in fragrances. They exhibit fresh-cassis and ripe-estery notes, and remind on grapefruit and/or citrus and/or Riesling wine.

It was found that the organoleptic properties of the R and S isomers are very similar. Therefore, from the economic point of view, the easier and cheaper accessible racemates are preferred over the pure enantiomers.

Based on their clear fruity organoleptic properties, the compounds are suitable for the creation of flavor and fragrance compositions. They can be combined in the usual manner with practically all available flavor or fragrance raw materials, i.e. synthetic and/or nature identical and/or natural substances and/or natural extracts and/or additional carrier materials and/or further additives used in the flavor or fragrance field.

Specifically, the very distinct berry and estery floral notes of the compounds according to the invention enable the production of specific and characteristic flavor profiles, which are new. These can be used for the aromatization of foodstuffs, beverages, pharmaceuticals, oral hygiene products (e.g. toothpaste) or other healthcare products.

Further, specifically the compounds of the invention add a berry, fruity and some tropical aspects to fruit flavor compositions such as peach, strawberry, passion fruit, citrus and raspberry. Thereby the body of the flavor is increased and its stability (longevity) improved. However, use is not restricted to fruit flavors, as the inventive compounds can also be combined also with herbal, mint and savory flavors, whereby they especially increase the fullness, freshness and/or the herbal character. For example, in meat flavors, they increase the natural meat aroma.

Due to their fruity odor characteristics, the compounds of the invention can also be used in fragrance compositions such as fine fragrances or perfumed products of all kinds, especially cosmetic articles, consumer healthcare or household products as, e.g., washing agents, detergents, soaps or toothpaste. Here, specifically, the inventive compounds add an herbal-fruity and, surprisingly, also a marine aspect to floral, musk and woody accords. At the same time the freshness is increased.

The preferred dosage range of the compounds according to the invention in a food, a beverage, a consumer healthcare or a household product is from 0.001 mg/kg to 500 mg/kg, preferably 0.01 mg/kg to 50 mg/kg. In fragrance compositions, concentrations of the inventive compound(s) from 0.001% to 30%, preferably from 0.01% to 10%, are preferably used.

Instead of directly using a compound of the invention as a flavor or fragrance ingredient, it may be advantageous to use a precursor thereof, i.e. a chemical derivative of a compound according to the invention which can be easily transformed to the compound according to the invention. The precursors themself can already be of sensorial interest. For example, and preferably, as precursors the esters of 3-acylthio acids, which can be obtained by treatment of the compounds according to the invention with acyl chloride, may be added to an aroma or food or fragrance composition. From the esters of 3-acylthioacids, the inventive compounds can be released by enzymatic hydrolysis and/or chemical treatment. This reaction can take place either in the flavor or fragrance composition, or in the products containing these compositions.

The present invention is described further in the following examples, which are presented solely for the non-limiting purpose of further illustrating the invention.

EXAMPLE 1

Synthesis of 3-mercaptopentanoic acid methyl ester

At 0° C., 5.71 g of 2-pentenoic acid methyl ester was introduced in a 500 mL round-bottom flask containing 200 mL of dry methanol. A solution of 4.44 g of NaSH·$H_2O$ and 2.57 mL acetic acid in 100 mL methanol was then added. The resulting orange mixture was stirred at room temperature for two days. The solution was then concentrated, taken in ether, washed with water, dried over $MgSO_4$, filtered and concentrated again. This gave seven grams of a pale yellow oil containing about 38% of the desired compound, which was purified by column chromatography.

EXAMPLE 2

Synthesis of (R)-3-mercaptobutanoic acid methyl ester

The synthesis was done according to the description of Breitschuh, R. and Seebach, D.; *Synthesis*, 1992, 83–89 as follows:

At 0° C., 82.31 g of NaSH·H₂O was added to a 1.5 L round-bottom flask containing 600 mL of distilled water. To this solution, 83.08 g of (S)-b-butyrolactone was added over a period of 20 minutes. The mixture was stirred for 1 h at 0° C. and remained overnight at room temperature. The solution was then brought to pH 2 and was extracted with ether. The organic layer was washed with brine, dried over MgSO₄, filtered and concentrated to give 110 g of slightly yellow oil. In a 250 mL flask, 30 g of the oil previously obtained was dissolved in 80 mL of methanol. A catalytic amount of sulfuric acid was added to the mixture, which was heated at reflux for 19 h. The solution was then concentrated and partitioned between ether and cold brine. The organic layer was washed with sodium bicarbonate and brine, dried over MgSO₄, filtered, and concentrated. The result was 35.2 g of oil, which was purified by chromatography on silica gel.

EXAMPLE 3

Synthesis of 3-acetylthiobutanoic acid hexyl ester

At room temperature, in a 250 mL round-bottom flask with a gas outlet, 21 g of 3-mercaptobutanoic acid hexyl ester was dissolved in 50 mL of neat acetyl chloride. The mixture was stirred at room temperature for 6 h. It was then cooled to 0° C. and the reaction was quenched by careful addition of 100 mL of dry methanol in small portions. The mixture was then washed with bicarbonate, dried over MgSO₄, filtered, and concentrated, and gave the acetylated compound in 98% yield.

EXAMPLE 4

To a tropical fruit soft drink of the following composition (a), containing the following fruit flavor (b), 0.1 mg/L 3-mercaptobutanoic acid methyl ester was added.

(a) Composition of typical tropical fruit soft drink:

|  | [g] |
| --- | --- |
| water | 9500 |
| sugar syrup 65 Brix | 170 |
| citric acid 50% | 5 |
| sodium citrate | 0.4 |
| sodium benzoate | 0.15 |
| tropical fruit flavor (b) | 0.3 |

(b) Composition of tropical fruit flavor:

|  | [g] |
| --- | --- |
| benzaldehyde | 4.0 |
| linalool | 4.0 |
| (Z)-3-hexenyl butanoate | 4.0 |
| 4-hydroxy-2,5-dimethyl-2(5H)-dihydrofuran-3-one | 8.0 |
| ethyl butanoate | 30.0 |
| hexyl butanoate | 24.0 |
| ethyl hexanoate | 14.0 |
| 1-phenylethyl acetate | 9.8 |
| 3,7-dimethyl-2,6-octadienthiol | 0.2 |
| (Z)-3-hexenol | 2.0 |
| propylenglycol | 900.0 |

Compared with the aroma note of the starting soft drink, additionally a passion fruit typical top note occurred and, at the same time, the freshness was increased significantly.

EXAMPLE 5

To an orange soft drink (blank) of the composition as described below, and having an orange, aldehydic and soapy aroma, was added 3-mercaptobutanoic acid methyl ester, on one hand and, on the other hand, 3-mercaptohexanoic acid methyl ester. 3-mercaptohexanoic acid methyl ester is an example from the group of compounds described by Swiss patent 557 423 and having a structure closest to the compound of the present invention. Each of 3-mercaptobutanoic acid methyl ester and 3-mercaptohexanoic acid methyl ester was added at a level of 0.1 mg/L, and each was compared with the blank orange soft drink.

Composition of orange soft drink:

|  | [g] |
| --- | --- |
| water | 9500 |
| sugar syrup 65 Brix | 170 |
| citric acid 50% | 5 |
| sodium citrate | 0.4 |
| sodium benzoate | 0.15 |
| orange oil 40 fold | 0.005 |

The drink containing 3-mercaptobutanoic acid methyl ester exhibited an orange, mandarin, fresh squeezed juice note with strong fruity aspects, which is a significant improvement over the blank soft drink. In contrast, the drink containing 3-mercaptohexanoic acid methyl ester exhibited a strong fatty sulfury-woody aroma with a grapefruit aspect.

EXAMPLE 6

To a woodberry flavored yogurt (blank) consisting of components (a) and (b) as described below, 3-mercaptobutanoic acid methyl ester and 3-mercaptobutanoic acid ethyl ester were added. These were compared with a yogurt to which 3-mercaptohexanoic acid methyl ester was added. To the blank woodberry flavored yogurt 0.2 mg/kg of 3-mercaptobutanoic acid methyl ester was added.

(a) Yogurt (3.5% fat, 10.0% sucrose) with 1 g woodberry flavor per 1 kg yogurt (b).

| (b) Woodberry flavor | [g] |
| --- | --- |
| benzyl acetate | 0.5 |
| ethyl acetate | 4.0 |
| ethyl 3-methylbutanoate | 1.5 |
| (Z)-3-hexenol | 0.1 |
| alpha-ionone | 0.2 |
| linalool | 0.5 |
| 3-methylbutyl 3-methylbutanoate | 0.3 |
| 4-(4-hydroxyphenyl)-2-butanone | 2.0 |
| cyclopentadecanolide | 0.4 |
| vanillin | 0.5 |
| propylenglycol | 90.0 |

Compared with the blank woodberry flavored yogurt, a strong red fruit note, reminiscent on blackberry, was present. Addition of 3-mercaptobutanoic acid ethyl ester at 2 mg/kg to the blank woodberry flavored yogurt increased the freshness, and the overall flavor profile changed to blueberry. In contrast, an addition of 3-mercaptohexanoic acid methyl ester, i.e. a long chain 3-mercaptocarboxolic ester as described by Swiss patent 557 423, at 0.2 mg/kg, resulted in a soapy taste profile. At a level of 2 mg 3-mercaptohexanoic acid methyl ester per 1 kg yogurt yielded a fatty-meaty, sulfury aroma profile.

EXAMPLE 7

Comparison of two fragrance accords, either with 3-mercaptobutanoic acid methyl ester or with 3-mercaptohexanoic acid methyl ester To a clementine accord as described below, 0.004%$^{(w/w)}$ 3-mercaptobutanoic acid methyl ester was added. At that level, the accord turned from orange-mandarin to green clementine. The sample with addition of 3-mercaptobutanoic acid methyl ester was more sparkling, natural clementine and strongly increased the diffusivity. When the 3-mercaptohexanoic acid methyl ester was used instead, the diffusivity was much less, and a disturbing sulfury, fatty-meaty side note appeared.

Formula of clementine accord:

| | |
|---|---:|
| rose oxide | 1 |
| buchu leaf oil | 2 |
| geranyl acetate | 3 |
| geranyl butyrate | 3 |
| ethyl caprylate | 4 |
| (E)-2-hexenale | 4 |
| geranyl isobutyrate | 4 |
| cinnamic aldehyde | 5 |
| oxane 5% in dipropylene glycol | 5 |
| hexanale | 6 |
| (Z)-3-hexenol | 6 |
| linalool oxyd | 6 |
| isoeugenol acetate | 7 |
| corps pampelmousse 10% in triethyl citrate | 10 |
| benzaldehyde | 15 |
| allyl hepatanoate | 15 |
| cinnamyl acetate | 20 |
| beta ionone | 24 |
| ethyl acetoacetate | 60 |
| gamma undecalactone | 80 |
| ethyl acetate | 120 |
| labienoxime | 200 |
| lemon oil italy | 600 |
| furonol 1% in triethyl citrate | 1060 |
| orange oil 7-fold | 2000 |
| orange oil brasil | 2400 |
| dipropylene glycol | 3340 |
| | 10000 |

While the invention has been illustrated and described with respect to illustrative embodiments and modes of practice, it will be apparent to a person skilled in the art that various modifications and improvements may be made without departing from the scope and spirit of the invention. Accordingly, the invention is not to be limited by the illustrative embodiments and practice.

What is claimed is:

1. A method of adding a flavor or fragrance to a product to provide the product with a fruity note in the absence of a green and/or fatty note, the method comprising adding to the product at least one compound of formula 1

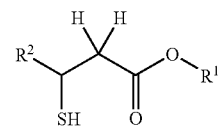

or a precursor thereof, wherein $R^1$ is selected from the group consisting of linear or branched alkyl, alkenyl and alkadienyl groups having from 1 to 8 carbon atoms and $R^2$ is selected from the group consisting of methyl and ethyl, with the proviso that $R^2$ is not methyl when $R^1$ is ethyl, thereby providing the product with a fruity note in the absence of a green and/or fatty note.

2. The method of claim 1 wherein the product is selected from the group consisting of a food, a beverage, a healthcare product, a household product, and combinations thereof.

3. The method of claim 1 wherein $R^1$ is selected from the group consisting of methyl, ethyl, n-propyl, iso-propyl, n-butyl, iso-butyl, tert-butyl, n-hexyl, (Z)-2-hexenyl, (E)-3-hexenyl, (E)-2-hexenyl, (Z)-3-hexenyl and n-octyl.

4. The method of claim 1 wherein at least one compound is selected from the group consisting of 3-mercaptobutanoic acid methyl ester, 3-mercaptobutanoic acid n-hexyl ester, (R)-3-mercaptobutanoic acid methyl ester, 3-mercaptobutanoic acid (Z)-3-hexenyl ester, 3-mercaptopentanoic acid ethyl ester, and precursors thereof.

5. The method of claim 1 wherein at least one compound is 3-mercaptobutanoic acid methyl ester.

6. The method of claim 1 wherein the precursor is formed by reaction of acyl chloride with the compound of formula 1.

7. The method of claim 1 wherein the compound(s) of formula I or the precursor(s) thereof is/are present in an amount of 0.001 mg/kg to 500 mg/kg of said product.

8. The method of claim 1 wherein the compound(s) of formula I or the precursor(s) thereof is/are present in an amount of 0.01 mg/kg to 50 mg/kg of said product.

* * * * *

UNITED STATES PATENT AND TRADEMARK OFFICE
CERTIFICATE OF CORRECTION

| | |
|---|---|
| PATENT NO. | : 7,105,194 B2 |
| APPLICATION NO. | : 09/800624 |
| DATED | : September 12, 2006 |
| INVENTOR(S) | : Gassenmeier et al. |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 115 days Delete the phrase "by 115 days" and insert -- by 91 days --

Signed and Sealed this

Nineteenth Day of February, 2008

JON W. DUDAS
*Director of the United States Patent and Trademark Office*